(12) United States Patent
Nomura

(10) Patent No.: US 7,463,285 B2
(45) Date of Patent: Dec. 9, 2008

(54) IMAGE PICKUP APPARATUS AND CAMERA-SHAKE CORRECTING METHOD THEREFOR

(75) Inventor: Hirofumi Nomura, Saitama (JP)

(73) Assignee: Sony Corporation (JP)

( * ) Notice: Subject to any disclaimer, the term of this patent is extended or adjusted under 35 U.S.C. 154(b) by 584 days.

(21) Appl. No.: 10/965,516

(22) Filed: Oct. 14, 2004

(65) Prior Publication Data

US 2005/0088532 A1    Apr. 28, 2005

(30) Foreign Application Priority Data

Oct. 23, 2003   (JP) .......................... P2003-363011

(51) Int. Cl.
*H04N 5/228* (2006.01)

(52) U.S. Cl. .................................. 348/208.4

(58) Field of Classification Search ............ 348/207.99, 348/330, 208.6; 396/50–55
See application file for complete search history.

(56) References Cited

U.S. PATENT DOCUMENTS 5,926,212 A * 7/1999 Kondo ................... 348/207.99

2002/0051007 A1* 5/2002 Kitagawa et al. ............ 345/660
2005/0057662 A1* 3/2005 Washisu ................ 348/208.99

FOREIGN PATENT DOCUMENTS

| JP | 8-046856 | 2/1996 |
| JP | 2003-032540 | 1/2003 |
| JP | 2003-259208 | 9/2003 |

* cited by examiner

*Primary Examiner*—Nhan T. Tran
*Assistant Examiner*—Trung Diep
(74) *Attorney, Agent, or Firm*—Lerner, David, Littenberg, Krumholz & Mentlik, LLP

(57) ABSTRACT

An image pickup apparatus that is capable of generating a still image whose S/N ratio is improved without narrowing the angle of view includes an image pickup having an image pickup element, in which an area for camera-shake correction is absent, for picking up an image of a subject; a camera-shake correcting unit for correcting picked-up image data of the image pickup according to a camera-shake component applied to the image pickup; and a still image generating unit having a function for determining whether a camera-shake image is present in an image pickup area of the image pickup and operative to find, for each coordinate point, an average of a cumulatively added image in which image data corrected by the camera-shake correcting unit within a predetermined time are added together, so as to generate a still image.

10 Claims, 4 Drawing Sheets

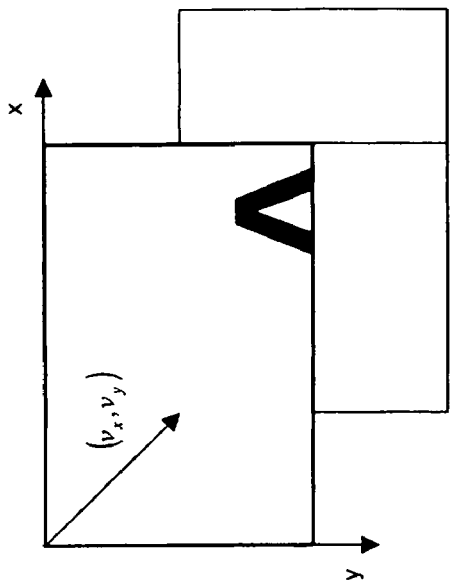
F I G. 2A
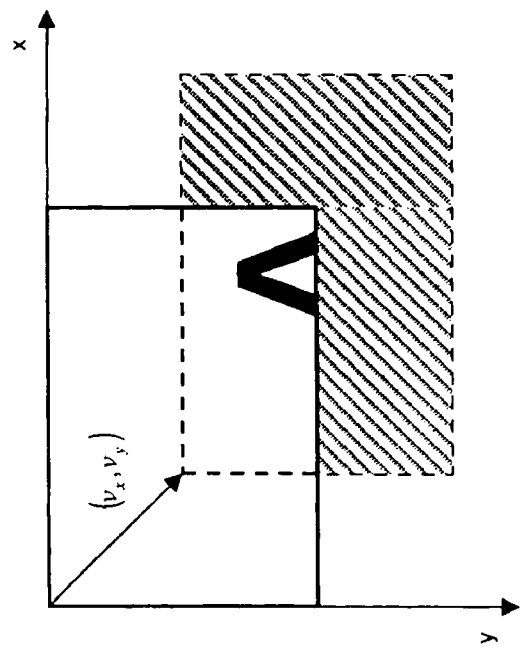
F I G. 2B
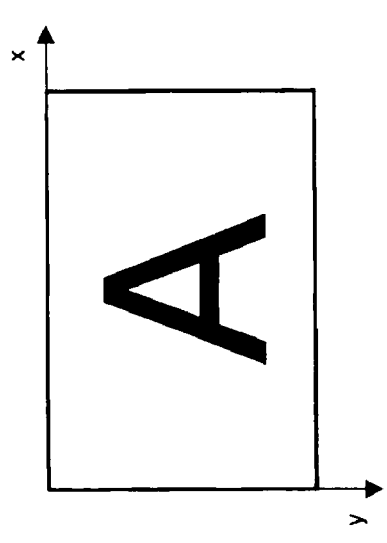
F I G. 2C

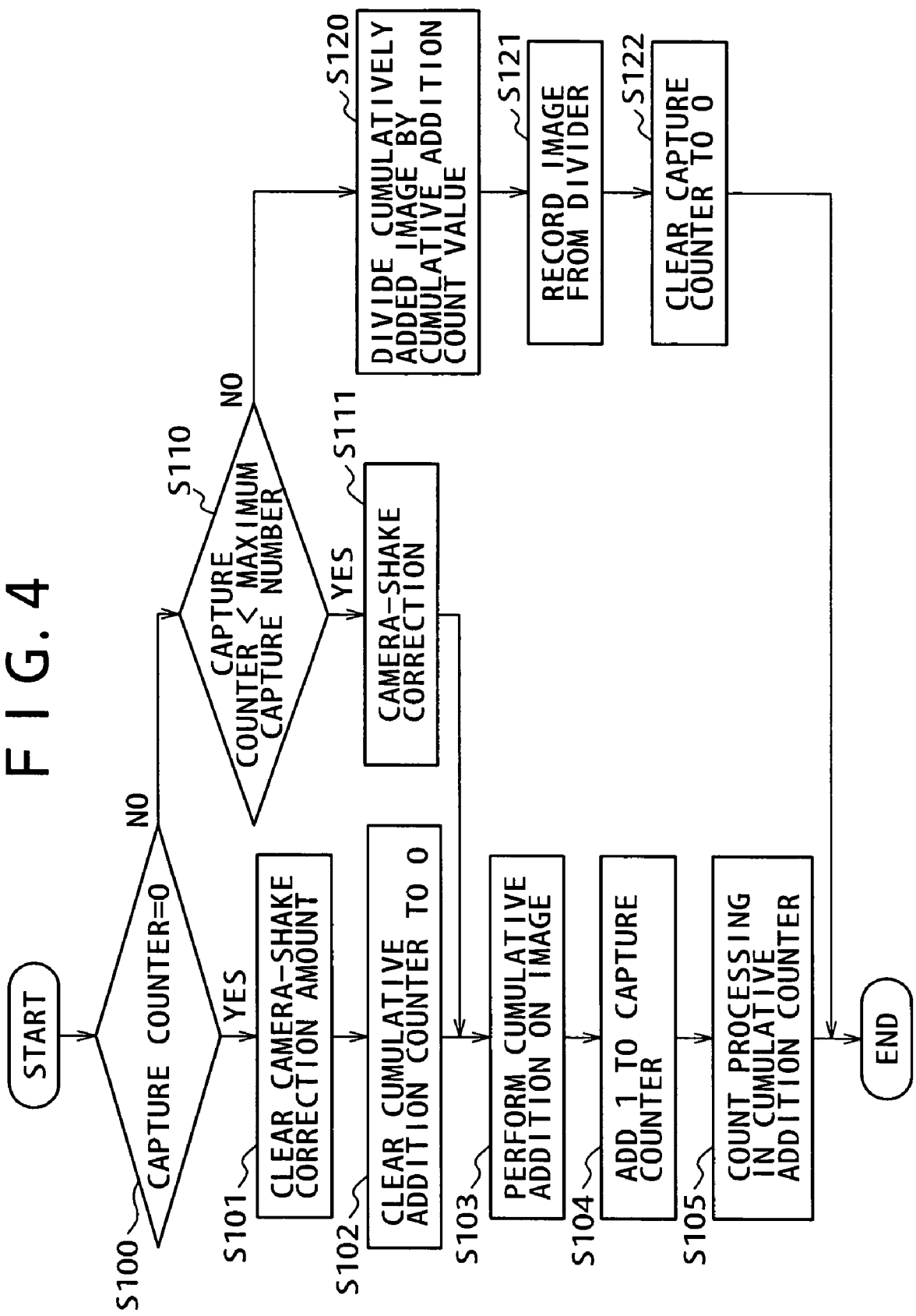

IMAGE PICKUP APPARATUS AND CAMERA-SHAKE CORRECTING METHOD THEREFOR

CROSS REFERENCE TO RELATED APPLICATION

This application claims priority from Japanese Priority Application No. 2003-363011, filed on Oct. 23, 2003 with the Japanese Patent Office, the entire content of which is hereby incorporated by reference.

BACKGROUND OF THE INVENTION

1. Field of the Invention

The present invention relates to an image pickup apparatus, such as an electronic still camera, having an electronic type of camera-shake correcting function for still images, and to a camera-shake correcting method for the image pickup apparatus.

2. Description of Related Art

There is a tendency for recent still image pickup apparatuses such as electronic still cameras to deteriorate in their S/N ratios, because of their higher pixel densities and greater miniaturizations. In addition, higher zooming magnifications of lenses lead to greater vulnerabilities to camera shakes.

To solve these problems, it has been proposed to provide a method which, as described in, for example, the following patent document 1, performs camera-shake correction on one frame image which constitutes a moving image, and subjects the corrected image to cumulative addition along the time axis so as to generate a still image.

[Patent Document 1] Japanese Patent Application Publication No. 2000-341577

SUMMARY OF THE INVENTION

There are optical and electronic types of camera-shake correcting methods for image pickup apparatuses. The optical types are disadvantageous in terms of miniaturization and cost reduction, and in many cases, the electronic types are adopted. However, existing electronic types of camera-shake correction including the above-cited patent document 1 perform the processing of extracting a part (an effective area) of an image pickup area (a valid area) according to camera shakes and outputting an image from which camera-shake components are removed, and this method has the problem that the angle of view of an image to be finally outputted becomes narrower than the effective area because the image pickup area needs an excess area for camera-shake correction.

The present invention has been made in view of the above-mentioned problem, and an aim of the present invention is to provide an image pickup apparatus capable of generating a still image whose S/N ratio is improved without narrowing its angle of view, and to provide a camera-shake correcting method for the image pickup apparatus.

To solve the above-mentioned problem, an image pickup apparatus according to the present invention is characterized by comprising: image pickup means having an image pickup element in which an area for camera-shake correction is absent, for picking up an image of a subject; camera-shake correcting means for correcting picked-up image data of the image pickup means according to a camera-shake component applied to the image pickup means; and still image generating means having a function for determining whether a camera-shake image is present in an image pickup area of the image pickup means, and operative to find, for each coordinate point, an average of a cumulatively added image in which image data corrected by the camera-shake correcting means within a predetermined time are added together, so as to generate a still image.

The still image generating means is characterized by performing no addition on image data at a coordinate point where a camera-shake image is determined to be absent in the image pickup area.

The still image generating means is characterized by having counting means for counting the number of times of addition of the image data, and causing the counting means to perform addition counting when it is determined that a camera-shake image is present in the image pickup area.

The still image generating means is characterized by, as to the first frame of the predetermined time, introducing picked-up data from the image pickup means and performing addition on the picked-up data.

The still image generating means is characterized by finding the average by dividing the cumulatively added image for each coordinate point by the number of times of addition where it is determined that the camera-shake image is present.

A camera-shake correcting method for an image pickup apparatus according to the present invention is characterized by using image pickup means having an image pickup element in which an area for camera-shake correction is absent, for picking up an image of a subject, and comprising: a camera-shake correcting step of correcting picked-up image data of the image pickup means according to a camera-shake component applied to the image pickup means; a cumulative addition step of performing addition on data of an image corrected in the camera-shake correcting step within a predetermined time; a decision step of determining whether a camera-shake image is present in an image pickup area of the image pickup means; a counting step of counting, for each coordinate point of the image, the number of times by which the camera-shake image is determined to be present within the predetermined time; and a division step of dividing a cumulatively added image subjected to the addition in the cumulative addition step, by the number of times counted in the counting step for each coordinate point.

The cumulative addition step is characterized by, as to the first frame of the predetermined time, introducing picked-up data from the image pickup means and performing addition on the picked-up data.

More specifically, the present invention includes means which has an image pickup element in which an excess area for camera-shake correction is absent, and performs correction according to a camera shake applied to an image pickup section for picking up an image of a subject.

The present invention is also constructed so that when an image corrected for image shake is to be cumulatively added, it is determined for each coordinate point whether an original image is present in an effective area which is the image pickup area of the image pickup section, and in the case of a coordinate point where the original image is absent in the effective area, cumulative addition is not performed on the image.

The present invention also includes a cumulative addition counter which stores the number of times by which cumulative addition is performed for each coordinate point of a still image, and is constructed to determine whether the original image is present in the effective area, and to increment the cumulative addition counter if the original image is present in the effective area.

The present invention is also constructed so that in the cumulative addition of an image corrected for image shake, the first one frame is set as a reference image for camera-shake correction and is inputted into a cumulative adder without being subjected to camera-shake correction.

The present invention also includes means for dividing an image cumulatively added for each coordinate point by a cumulative addition count value, when the cumulatively added image is to be subjected to division so as to generate a still image.

(1) According to an aspect of the present invention, in an electronic type of camera-shake correction for still images which is superior in terms of miniaturization, cost reduction and performance, since there is no need for an area for camera-shake correction (an excess area to be provided for camera-shake correction), the angle of view of an image to be finally outputted is prevented from becoming narrower than the image pickup area of the image pickup means (the effective area).

Furthermore, an average of the cumulatively added image corrected for camera-shake is found at each coordinate point, whereby it is possible to obtain an image improved in S/N ratio.

(2) According to an aspect of the present invention, even in the case where the amount of camera shake is large, image data not subjected to camera shake correction is introduced from the image pickup means, whereby it is possible to prevent a still image from becoming impossible to generate.

Further features of the invention, and the advantages offered thereby, are explained in detail hereinafter, in reference to specific embodiments of the invention illustrated in the accompanying drawings.

BRIEF DESCRIPTION OF THE DRAWINGS

FIGS. 2A-2C are explanatory views showing the relationship between an effective area and a camera-shake image area in the embodiment of the present invention;

FIG. 4 is a flowchart showing the flow of the entire control in the embodiment of the present invention.

DESCRIPTION OF THE PREFERRED EMBODIMENT

Figure 1:
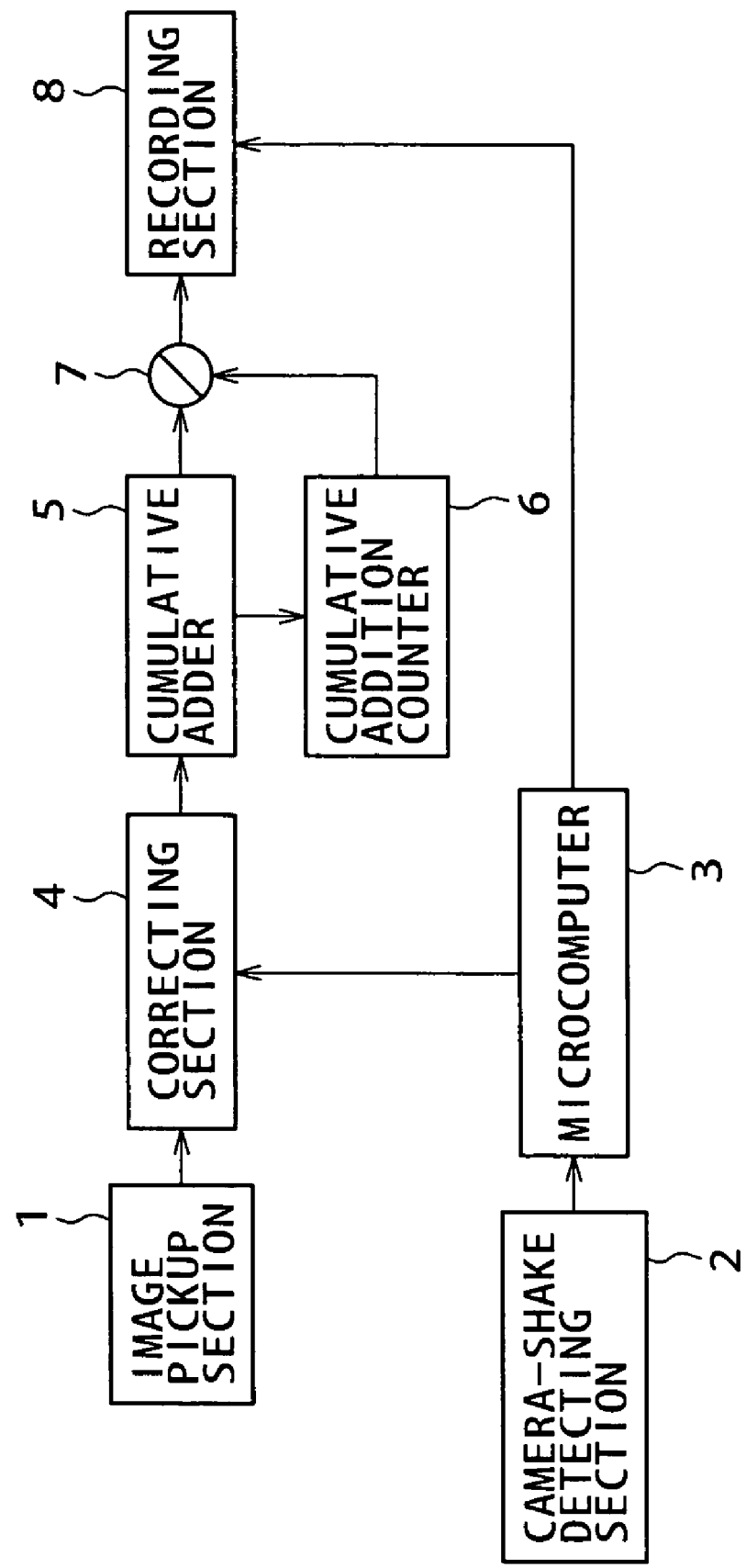
FIG. 1 is a block diagram showing the entire construction of an embodiment of the present invention.

An embodiment of the present invention will be described below with reference to the accompanying drawings, but the present invention is not limited to the embodiment. FIG. 1 is a block diagram showing the system construction of an image pickup apparatus according to the present invention. In FIG. 1, reference numeral 1 denotes an image pickup section (image pickup means of the present invention) which is provided with an image pickup element, a lens, signal processing and the like and outputs a taken image for each capture.

In the present invention, a valid area and an effective area of the image pickup section 1 are set as the same area. Namely, there does not exist an excess area for camera-shake correction, so that it is possible to solve the problem that an excess area becomes insufficient when a large camera shake is applied. At the same time, since the effective area is expanded, it is possible to solve the problem that an angle of view becomes narrow.

Reference numeral 2 denotes a camera-shake detecting section which detects a camera-shake component applied to the image pickup section 1. The camera-shake detecting section 2 outputs a detection signal using image recognition, an angular velocity signal from a gyro sensor, or the like, as camera-shake information.

Reference numeral 3 denotes a microcomputer which calculates a correction vector (a vector corresponding to a camera-shake amount) based on the camera-shake information outputted from the camera-shake detecting section 2. The microcomputer 2 controls the timing at which an image is recorded on a recording section 8 which will be described later.

Reference numeral 4 denotes a correcting section (camera-shake correcting means of the present invention) which corrects image data from the image pickup section 1. The correcting section 4 extracts the effective area from the valid area of the image pickup section 1 on the basis of a correction vector designated by the microcomputer 3.

Reference numeral 5 denotes a cumulative adder which performs cumulative addition on an image outputted from the correcting section 4 at the time of each capture, in the time-axis direction.

Reference numeral 6 denotes a cumulative addition counter (counting means of the present invention) which stores the number of times by which a cumulative addition valid area image which will be described later is cumulatively added, for each coordinate point of a cumulative addition area.

Reference numeral 7 denotes a divider which divides an image outputted from the cumulative adder 5, by a count value outputted from the cumulative addition counter 6 for each coordinate point.

The recording section 8 records an image outputted from the divider 7.

In the present embodiment, the cumulative adder 5, the cumulative addition counter 6 and the divider 7 constitute still image generating means of the present invention, which generates a still image subjected to addition and averaging for each coordinate point.

FIGS. 2A-2C show the states of image areas. FIG. 2A shows an effective area which is a still image area to be finally generated. FIG. 2B shows a subject which is arranged in the effective area when a camera-shake vector $(v_x, v_y)$ is applied to the image pickup section 1.

Letting $(x, y)$ denote each coordinate point in the effective area and $(v_x, v_y)$ denote the camera-shake vector, each coordinate point $(x', y')$ of a camera-shake area can be expressed as $(x', y')=(x+v_x, y+v_y)$.

FIG. 2C shows a camera-shake image area (an area surrounded by broken lines) and a cumulative addition invalid area (a hatched area) which are obtained when the camera-shake vector $(v_x, v_y)$ is applied to the effective area (an area surrounded by solid lines).

In the case where camera-shake correction is performed in the absence of an excess area like the present invention, the hatched area which is not projected into the effective area cannot be used as a corrected image, and therefore, this area is called the cumulative addition invalid area. Conversely, an area which is projected into the effective area and can be used for correction is called a cumulative addition effective area.

Letting A and B denote the effective area and the camera-shake image area, respectively, the cumulative addition invalid area and the cumulative addition valid area can be expressed as follows:

the cumulative addition invalid area=$B\backslash A$ (a difference set of $A$ and $B$)

the cumulative addition valid area=$A \cap B$ (a common part of $A$ and $B$)

This information on the cumulative addition invalid area and that on the cumulative addition valid area are used in the cumulative adder 5 and the cumulative addition counter 6 shown in FIG. 1.

In the cumulative addition of images corrected for camera shake, since an image does not exist in the cumulative addition invalid area, the processing of the cumulative adder 5 is interrupted as to the cumulative addition invalid area.

Letting Q denote a cumulatively added image, the cumulatively added image Q at time t can be expressed by the following expression (1):

[Expression 1] (1)

$$Q_t(x, y) = \begin{cases} Q_{t-1}(x, y) + B_t(x, y) & \text{(cumulative addition valid area)} \\ Q_{t-1}(x, y) & \text{(cumulation addition invalid area)} \end{cases}$$

where t>0, $Q_0(x,y)=B_0(x,y)$.

Addition and averaging are performed when a still image is to be finally generated, but since the number of times of addition differs for each coordinate point, the number of times by which a cumulative addition valid area image has been cumulatively added needs to be stored for each coordinate point of the cumulative addition area.

In the cumulative addition of images corrected for camera shake, the cumulative addition counter 6 adds 1 to its count value as to the cumulative addition valid area, but as to the cumulative addition invalid area, maintains its current count value.

Letting S denote a cumulative addition count value, a cumulative addition count value $S_t$ at time t can be expressed by the following expression (2):

[Expression 2] (2)

$$S_t(x, y) = \begin{cases} S_{t-1}(x, y) + 1 & \text{(cumulative addition valid area)} \\ S_{t-1}(x, y) & \text{(cumulative addition invalid area)} \end{cases}$$

where t>0, $S_0(x, y)=1$.

Figure 3B:
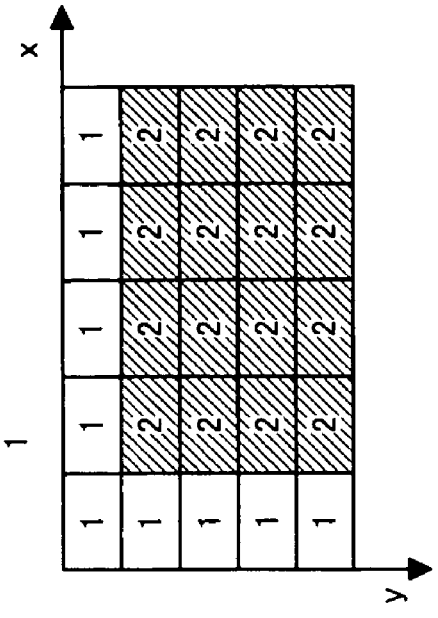
FIGS. 3A-3C are explanatory views showing the relationship between the effective area and the camera-shake image area in the embodiment of the present invention, and showing the state of each coordinate point when a camera shake is applied.
Figure 3A:
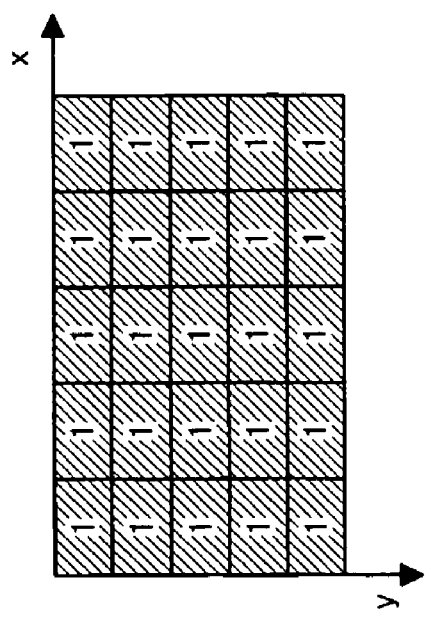
Figure 3C:
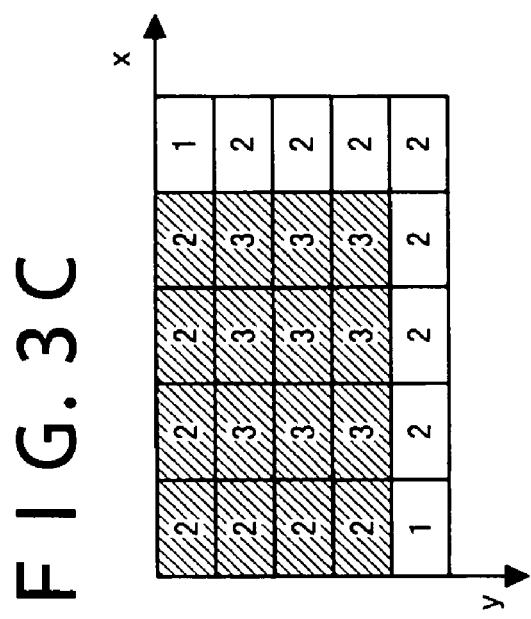

FIGS. 3A-3C show variations of the cumulative addition count value on a time-series basis, and show the cases where camera-shake vectors (0, 0), (−1, −1) and (1, 1) are respectively applied to the image pickup section 1 in that order.

At time 0, since the camera-shake vector is cleared to (0, 0), the effective area (the hatched area) shown in FIG. 3A becomes the cumulative addition valid area, and the cumulative addition counter 6 sets 1 to each coordinate point of the effective area (the hatched area).

At time 1, since the camera-shake vector is (−1, −1), the effective area (the hatched area) shown in FIG. 3B becomes the cumulative addition valid area, and the cumulative addition counter 6 cumulatively adds 1 to each coordinate point of the effective area (the hatched area).

At time 2, since the camera-shake vector is (1, 1), the effective area (the hatched area) shown in FIG. 3C becomes the cumulative addition valid area, and the cumulative addition counter 6 cumulatively adds 1 to each coordinate point of the effective area (the hatched area).

In the division processing of the divider 7, addition and averaging are performed for each coordinate point when a still image is to be finally generated. The cumulatively added image (Q) is divided by the cumulative addition counter value (S) for each coordinate point, thereby generating a still image subjected to addition and averaging for each coordinate point.

Letting U denote a still image, a still image $U_t$ at time t can be expressed by the following expression (3):

[Expression 3] (3)

$$U_t(x, y) = \frac{Q_t(x, y)}{S_t(x, y)}$$

FIG. 4 shows the flow of the entire control to be performed by, for example, the microcomputer 3 shown in FIG. 1. This control flow is called at the time of each capture. First, in step S100, it is determined whether a capture counter for counting the number of captured images has a count value of 0. If the answer is true, the process proceeds to step S101, whereas if the answer is false, the process proceeds to step S110.

In step S101, a camera-shake correction vector is cleared to (0, 0) in order to set an initial image as a reference position for correction. In the following capture, a camera-shake vector relative to the initial image is handled as a camera-shake correction vector.

In step S102, all the cumulative addition counter values stored for the respective coordinate points are cleared to 0.

In step S103, the captured initial image or an image corrected for camera shake is subjected to cumulative addition in the time-axis direction. The initial image is always subjected to cumulative addition without being subjected to camera-shake correction. This is intended to prevent a still image from becoming impossible to generate when the camera-shake vector of the captured image is large and the whole image area becomes the cumulative addition invalid area.

In step S104, 1 is added to the count value of the capture counter.

In step S105, it is determined whether the cumulative addition area is the cumulative addition valid area or the cumulative addition invalid area for each coordinate of the cumulative addition area, and in the case of the cumulative addition valid area, 1 is added to the cumulative addition counter value at the corresponding coordinate point.

In step S110, it is determined whether the count value of the capture counter is larger than the maximum capture number. If the answer is true, the process proceeds to step S111, whereas if the answer is false, the process proceeds to step S120.

In step S111, a correction vector is calculated from a camera-shake vector acquired from the camera-shake detecting section 2, and correction is performed. This camera-shake correction vector is a vector based on the initial image.

In step S120, division processing is performed with cumulative addition count values outputted from the cumulative addition counter 6, at the respective coordinate points of an image outputted from the cumulative adder 5, thereby generating an image subjected to addition and averaging.

In step S121, the image outputted from the divider 7 is recorded on the recording section 8.

In step S122, the capture counter is cleared to 0.

Incidentally, still image generating means of the present invention is not limited to the above-described embodiment, and may also be made of other apparatuses having similar functions.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is

1. An image pickup apparatus comprising:
   image pickup means having an image pickup element in which an area for total camera-shake correction when a large camera shake occurs is absent, for picking up an image of a subject;
   camera-shake correcting means for correcting picked-up image data of said image pickup means according to a camera-shake component applied to said image pickup means; and
   still image generating means for determining whether a camera-shake image is present in an image pickup area of said image pickup means, and for finding, for each coordinate point, an average of a cumulatively added image in which image data corrected by said camera-shake correcting means within a predetermined time are added together, so as to generate a still image, in which addition is performed on respective image data at a respective coordinate point when a part of the camera-shake image corresponding to the respective coordinate point is determined to be in said image pickup area and in which the addition is not performed on the respective image data at the respective coordinate point when the part of the camera-shake image corresponding to the respective coordinate point is determined to be outside said image pickup area.

2. The image pickup apparatus according to claim 1, wherein said still image generating means comprises counting means for counting a number of additions of said image data, and causing said counting means to perform addition counting when it is determined that a camera-shake image is present in said image pickup area.

3. The image pickup apparatus according to claim 1, wherein said still image generating means is characterized by, as to the first frame of the predetermined time, introducing picked-up data from said image pickup means and performing addition on said picked-up data.

4. The image pickup apparatus according to claim 2, wherein said still image generating means is characterized by, as to the first frame of the predetermined time, introducing picked-up data from said image pickup means and performing addition on said picked-up data.

5. The image pickup apparatus according to claim 1, wherein said still image generating means is characterized by finding the average by dividing said cumulatively added image for each coordinate point by the number of additions when it is determined that said camera-shake image is present.

6. The image pickup apparatus according to claim 2, wherein said still image generating means is characterized by finding the average by dividing said cumulatively added image for each coordinate point by the number of additions when it is determined that said camera-shake image is present.

7. The image pickup apparatus according to claim 3, wherein said still image generating means is characterized by finding the average by dividing said cumulatively added image for each coordinate point by the number of additions when it is determined that said camera-shake image is present.

8. The image pickup apparatus according to claim 4, wherein said still image generating means is characterized by finding the average by dividing said cumulatively added image for each coordinate point by the number of additions when it is determined that said camera-shake image is present.

9. A camera-shake correcting method for an image pickup apparatus using an image pickup having an image pickup element in which an area for total camera-shake correction when a large camera shake occurs is absent, for picking up an image of a subject, said method comprising:
   a camera-shake correcting step of correcting picked-up image data of said image pickup means according to a camera-shake component applied to said image pickup;
   a cumulative addition step of performing addition on data of an image corrected in said camera-shake correcting step within a predetermined time;
   a decision step of determining whether a camera-shake image is present in an image pickup area of said image pickup;
   a counting step of counting, for each coordinate point of said image, a number of times by which said camera-shake image is determined to be present within the predetermined time; and
   a division step of dividing a cumulatively added image subjected to the addition in said cumulative addition step, by the number of times counted in said counting step for each coordinate point,
   in which addition is performed on respective data at a respective coordinate point when a part of the camera-shake image corresponding to the respective coordinate point is determined to be in said image pickup area and in which the addition is not performed on the respective data at the respective coordinate point when the part of the camera-shake image corresponding to the respective coordinate point is determined to be outside said image pickup area.

10. The camera-shake correcting method according to claim 9,
   wherein said cumulative addition step is characterized by, as to the first frame of said predetermined time, introducing picked-up data from said image pickup and performing addition on said picked-up data.

* * * * *